United States Patent
Hoyle

(10) Patent No.: US 11,193,628 B2
(45) Date of Patent: Dec. 7, 2021

(54) COLLAPSIBLE LEG ASSEMBLY FOR SELF-LEVELING DEVICES

(71) Applicant: Gary C. Hoyle, Cumming, GA (US)

(72) Inventor: Gary C. Hoyle, Cumming, GA (US)

( * ) Notice: Subject to any disclaimer, the term of this patent is extended or adjusted under 35 U.S.C. 154(b) by 337 days.

(21) Appl. No.: 15/878,730

(22) Filed: Jan. 24, 2018

(65) Prior Publication Data

US 2019/0226633 A1    Jul. 25, 2019

(51) Int. Cl.
| | | |
|---|---|---|
| *F16M 11/24* | (2006.01) | |
| *A47C 7/00* | (2006.01) | |
| *A47B 13/02* | (2006.01) | |
| *A47B 3/00* | (2006.01) | |
| *A47B 91/16* | (2006.01) | |
| *F16M 11/16* | (2006.01) | |

(52) U.S. Cl.
CPC ......... *F16M 11/245* (2013.01); *A47B 3/002* (2013.01); *A47B 13/02* (2013.01); *A47B 91/16* (2013.01); *A47C 7/008* (2013.01); *F16M 11/16* (2013.01); *A47B 2200/0016* (2013.01)

(58) Field of Classification Search
CPC .... B25H 1/06; B25H 1/04; A47B 3/06; A47B 3/02; A47B 2200/0016
See application file for complete search history.

(56) References Cited

U.S. PATENT DOCUMENTS

| | | | | | |
|---|---|---|---|---|---|
| 3,045,777 | A | * | 7/1962 | Dintelmann | A47B 13/021 |
| | | | | | 182/153 |
| 3,858,682 | A | * | 1/1975 | Larson | B25H 1/06 |
| | | | | | 182/153 |
| 4,199,135 | A | * | 4/1980 | Wohrle | B25B 1/24 |
| | | | | | 269/100 |
| 4,620,613 | A | * | 11/1986 | Albertson | B25H 1/06 |
| | | | | | 182/153 |
| 5,007,502 | A | * | 4/1991 | Shapiro | B25H 1/06 |
| | | | | | 182/151 |
| 5,647,455 | A | * | 7/1997 | Russell | B25H 1/06 |
| | | | | | 182/153 |

(Continued)

FOREIGN PATENT DOCUMENTS

| | | |
|---|---|---|
| DE | 88 01 087 U1 | 4/1988 |
| DE | 10 2008 042167 A1 | 3/2010 |

OTHER PUBLICATIONS

International Search Report and Written Opinion dated May 2, 2019 for Application No. PCT/US2019/014441, 18 pgs.

*Primary Examiner* — Bradley Duckworth

(57) ABSTRACT

A collapsible leg assembly that includes a first leg having an upper portion and a lower portion; a second leg having an upper portion and a lower portion; a crossbar extending between the lower portions of the first and second legs, wherein the crossbar further includes a first section and a second section that are either flexibly connected to one another or detachably connected to one another; an upper leg receptacle that is adapted to receive the upper portion of the first leg in a hinged manner and the upper portion of the second leg in a hinged manner; a first lower leg receptacle that is adapted to receive the bottom portion of the first leg in a fixed manner and the first section of the crossbar in hinged manner; and a second lower leg receptacle that is adapted to receive the bottom portion of the second leg in a fixed manner and the second section of the crossbar in hinged manner.

6 Claims, 10 Drawing Sheets

(56) References Cited

U.S. PATENT DOCUMENTS

| | | | |
|---|---|---|---|
| 6,712,180 B2 * | 3/2004 | Levy | B25H 1/06 182/153 |
| 7,172,053 B2 * | 2/2007 | Slavich | B25H 1/06 182/153 |
| 7,644,899 B2 * | 1/2010 | Fasanella | B25H 1/06 182/186.3 |
| 9,140,401 B2 | 9/2015 | Hoyle | |
| 9,453,608 B2 | 9/2016 | Hoyle | |
| 9,863,573 B2 | 1/2018 | May | |
| D842,015 S * | 3/2019 | Strempke | D6/684 |
| 2005/0045422 A1 * | 3/2005 | Remmers | B25H 1/06 182/153 |
| 2010/0288585 A1 * | 11/2010 | Katz | B25H 1/04 182/155 |
| 2018/0291685 A1 * | 10/2018 | Moreno | E06C 7/14 |

* cited by examiner

COLLAPSIBLE LEG ASSEMBLY FOR SELF-LEVELING DEVICES

BACKGROUND OF THE INVENTION

The described invention relates in general to self-leveling tables, platforms, benches, chairs, stands, supports, and other substantially flat or planar surfaces of various shapes, and more specifically to collapsible leg assemblies for use with such devices.

Substantially flat or planar platforms are common utilitarian components found in many items including tables; benches; chairs; cooking surfaces; work surfaces; elevated storage containers; hunting, fishing, and camping products; and many others. Most of these platforms are most useful when they are in a level position (i.e., positioned horizontally). However, placing and holding a substantially flat or planar platform in a level position can be challenging, particularly when the surface or substrate upon which the platform is placed is uneven. In restaurants, coffee shops, and other establishments, encountering tables or chairs that wobble or tilt, or that are otherwise unstable is a common and annoying occurrence for many people. An unstable table or chair is also more likely to collapse or fall over, thereby creating a risk of injury to the person using the item. Furthermore, an unstable work platform may present a significant safety hazard, particularly if the platform is being used for activity that involves sawing or other reciprocating motion that would encourage the work platform to tip over or collapse. Legs or other support structures attached to such platforms may be collapsible, foldable, or adjustable with regard to height and/or angle relative to the platform itself; however, these support structures are not typically adjustable with regard to maintaining the platform in a level position when the platform is sitting on an uneven substrate.

Self-adjusting support assemblies for use on uneven substrates or surfaces are described in U.S. Pat. Nos. 9,140,401 and 9,453,608, which are incorporated herein by reference, in their entirety, for all purposes. U.S. Pat. Nos. 9,140,401 and 9,453,608 both teach a self-adjusting support assembly for use on uneven surfaces that includes: (a) a support element (e.g., a platform, work surface, tabletop, or seat); (b) at least one pivoting leg assembly positioned beneath the support element; and (c) at least one self-adjusting attachment assembly connecting the support element to the at least one pivoting leg assembly. Each self-adjusting attachment assembly includes: (i) a bracket that is adapted to attach to the support element; and (ii) a proximal head portion that is adapted to rotationally cooperate with the bracket and to receive the pivoting leg assembly. The bracket includes: (i) a receiving channel formed therein that is positioned along a predetermined angled axis of insertion; and (ii) a locking ridge positioned within the receiving channel. The proximal head portion includes: (i) a flange formed at one end thereof that rotationally engages the locking ridge; (ii) a stem positioned beneath the flange that rotationally engages the receiving channel; and (iii) a receiving portion positioned beneath the stem that is adapted to receive the pivoting leg assembly.

The self-adjusting attachment assemblies taught by U.S. Pat. Nos. 9,140,401 and 9,453,608 can be attached to and effectively used with almost any type of platform, and many types of pre-existing devices (tables, benches, chairs, etc.) can be modified by retrofitting to include the self-adjusting attachment assemblies and the pivoting leg assemblies with which the self-adjusting attachment assemblies are designed to work. However, the pivoting leg assemblies, which are typically triangular, can create certain challenges associated with transporting and storing the platforms to which the pivoting leg assemblies are attached. Accordingly, there is a need for collapsible leg assemblies for use with the self-leveling devices described in U.S. Pat. Nos. 9,140,401 and 9,453,608.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a collapsible leg assembly is provided. This collapsible leg assembly includes a first leg having an upper portion and a lower portion; a second leg having an upper portion and a lower portion; a crossbar extending between the lower portions of the first and second legs, wherein the crossbar further includes a first section and a second section that are either flexibly connected to one another or detachably connected to one another; an upper leg receptacle that is adapted to receive the upper portion of the first leg in a hinged manner and the upper portion of the second leg in a hinged manner; a first lower leg receptacle that is adapted to receive the bottom portion of the first leg in a fixed manner and the first section of the crossbar in hinged manner; and a second lower leg receptacle that is adapted to receive the bottom portion of the second leg in a fixed manner and the second section of the crossbar in hinged manner.

In accordance with another aspect of the present invention, a collapsible leg assembly for use with self-leveling platforms or supports is provided. This collapsible leg assembly includes a first tubular leg having an upper portion and a lower portion; a second tubular leg having an upper portion and a lower portion; a crossbar extending between the first and second legs, wherein the crossbar further includes a first section and a second section, and wherein the first and second sections of the crossbar are either flexibly connected to one another by a hinge or detachably connected to one another by mechanical means; an upper leg receptacle that is adapted to receive the upper portion of the first leg in a hinged manner and the upper portion of the second leg in a hinged manner, and wherein the upper leg receptacle further includes a stem and a flange positioned on top of the stem; a first lower leg receptacle that is adapted to receive the first leg in a fixed manner and the first section of the crossbar in hinged manner; and a second lower leg receptacle that is adapted to receive the second leg in a fixed manner and the second section of the crossbar in hinged manner.

In yet another aspect of this invention, another collapsible leg assembly for use with self-leveling platforms or supports is provided. This collapsible leg assembly includes a first tubular leg having an upper portion and a lower portion; a second tubular leg having an upper portion and a lower portion; a substantially flat or tubular crossbar extending between the first and second legs, wherein the crossbar further includes a first section and a second section, and wherein the first and second sections of the crossbar are either flexibly connected to one another or detachably connected to one another; an upper leg receptacle, wherein the upper leg receptacle is adapted to receive the upper portion of the first leg in a hinged manner and the upper portion of the second leg in a hinged manner, and wherein the upper leg receptacle further includes a stem and a flange positioned on top of the stem, and wherein the stem and flange are adapted to cooperate with a bracket assembly that includes a first section having a stem and flange receiving region formed therein; a second section having a stem and flange receiving region formed therein, wherein the first and section sections cooperate with each other to enclose the stem and flange on the upper leg receptacle and mechanically cooperate therewith to permit rotational and pivotal movement between the upper leg receptacle and the bracket assembly; a first lower leg receptacle that is adapted to receive the first leg in a fixed manner and the first section of the crossbar in hinged manner; and a second lower leg receptacle that is adapted to receive the second leg in a fixed manner and the second section of the crossbar in hinged manner.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1:
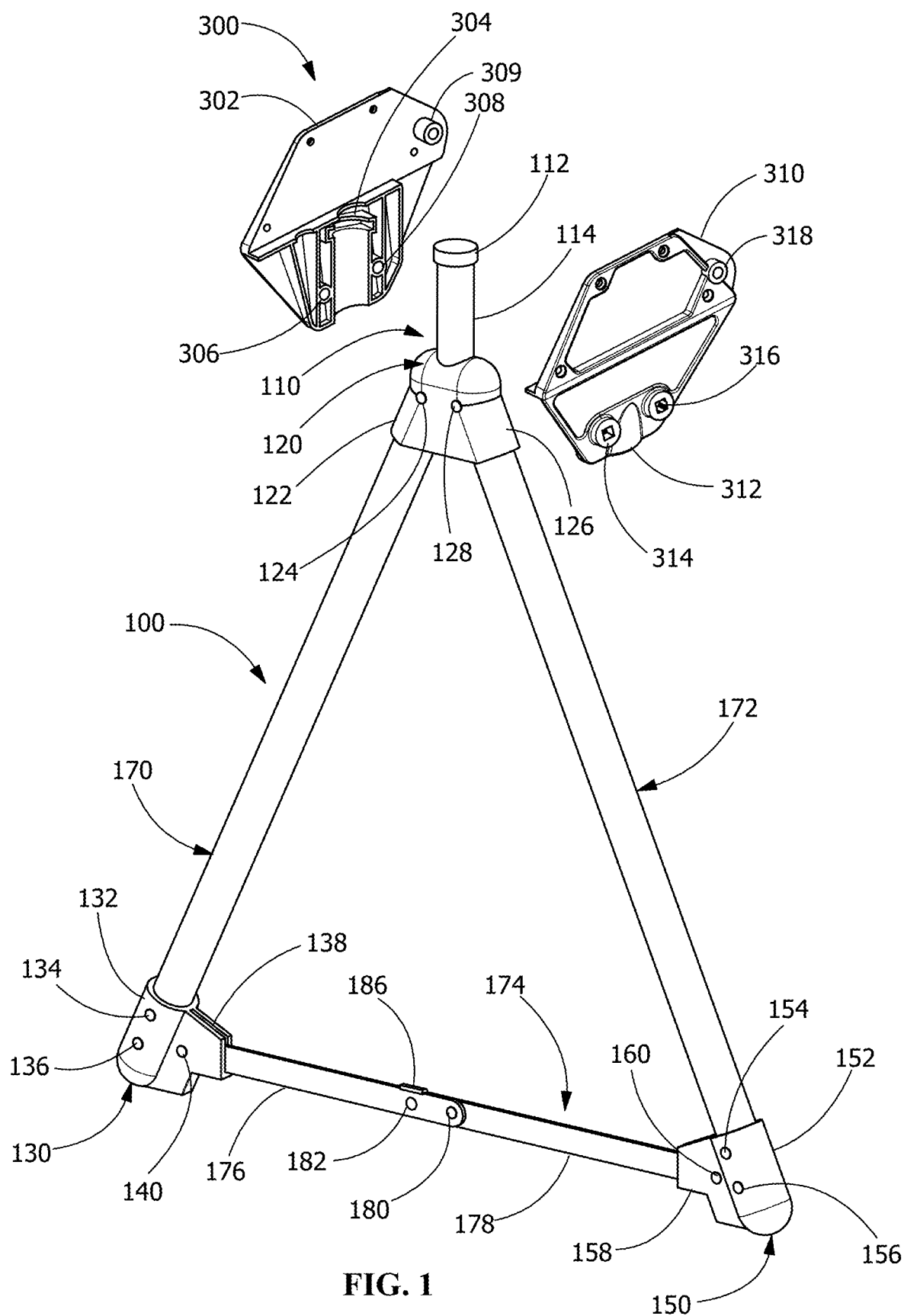
FIG. 1 is a front, perspective view of a collapsible leg assembly in accordance with a first embodiment of the present invention, wherein the collapsible leg assembly is shown in combination with a bracket assembly, shown in an exploded view, with which the collapsible leg assembly is adapted to cooperate.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention provides collapsible leg assemblies for use with the self-leveling devices described in U.S. Pat. Nos. 9,140,401 and 9,453,608 and other systems and devices. The STABLZ® family of products provides various platforms that are supported by sets of triangular legs that operate to "self-level" these platforms on uneven substrates. Within the context of this invention and in describing the STABLZ® products generally, the phrase "self-leveling" refers to the mechanical relationship between the platform, the legs (which are typically triangular in overall shape) that support the platform, and the bracket assembly that attaches the legs to the platform. The bracket assembly receives and houses the legs in a manner that permits the upper portion of the legs to rotate and pivot, independent of one another, thereby permitting a user of the device to orient the platform in a level position even if the bottom portions of the legs are resting on an uneven substrate or surface. The platforms compatible with this system can vary in size, weight, and shape; however, the triangular pivoting leg assemblies can create certain challenges associated with transporting and storing the platforms to which the leg assemblies are attached. Accordingly, the present invention provides pivoting leg assemblies for use with the bracket assemblies described above, wherein the pivoting leg assemblies can be collapsed to occupy less physical space, thereby facilitating transportation and storage of the entire self-leveling device.

Figure 4A:
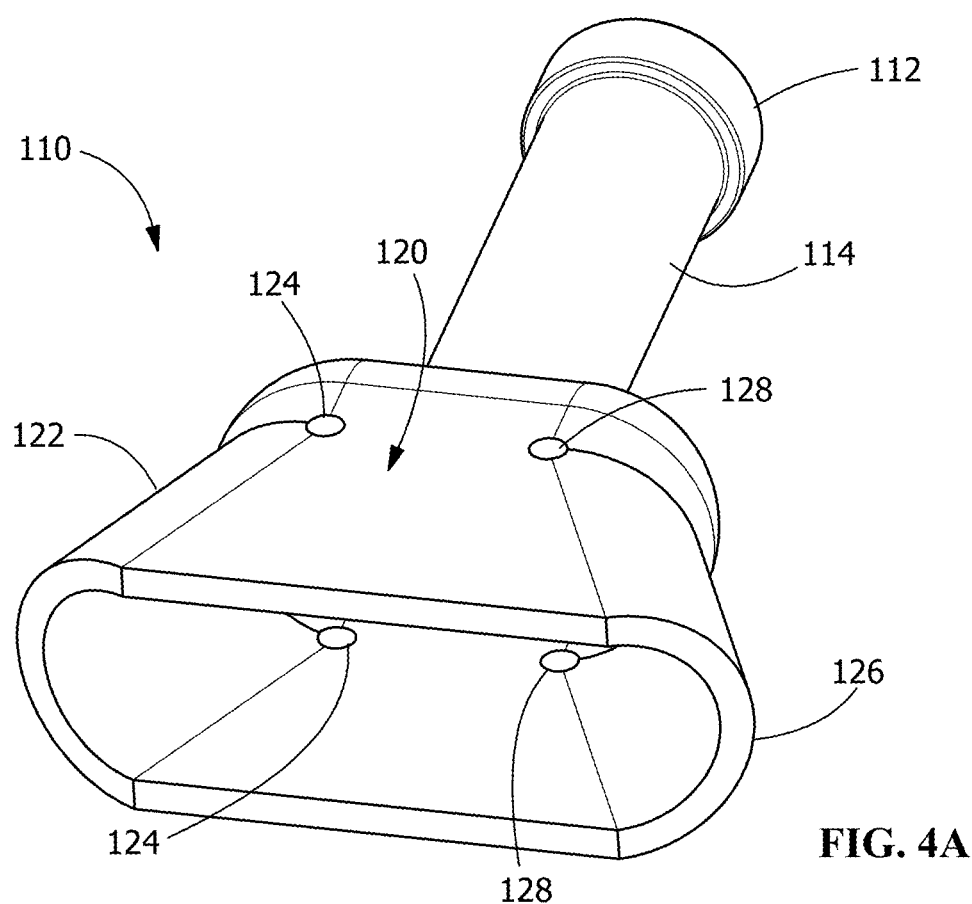
FIG. 4A is a bottom perspective view of an upper leg receptacle component, in accordance with a first exemplary embodiment of the present invention.
Figure 4B:
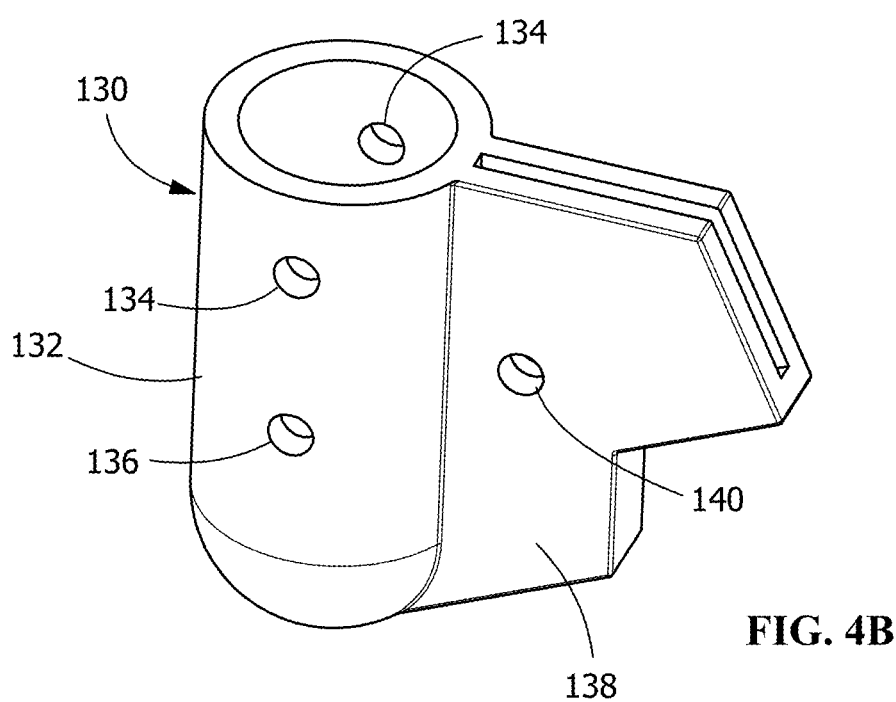
FIG. 4B is a side perspective view of a lower leg receptacle component, in accordance with a first exemplary embodiment of the present invention.

With reference to the Figures, FIG. 1 provides a front, perspective view of a collapsible leg assembly in accordance with a first embodiment of the present invention. As shown in FIG. 1, collapsible leg assembly 100 (the overall geometry of which is typically triangular) includes pivot device 110, upper leg receptacle 120, first lower leg receptacle 130, second lower leg receptacle 150, first leg 170, second leg 172, and substantially flat hinged crossbar 174. Pivot device 110, which is adapted to pivotally and rotationally engage bracket assembly 300, includes flange 112, which is positioned on top of stem 114. Upper leg receptacle 120 is formed integrally with pivot device 110 and includes first leg receiving portion 122, which further includes first aperture 124 for receiving a pin, rivet, or bolt therein; and second leg receiving portion 126, which further includes second aperture 128, also for receiving a pin, rivet, or bolt therein (see also FIG. 4A). First lower leg receptacle 130 includes leg receiving portion 132, which further includes first and second apertures 134 and 136 respectively for receiving rivets or bolts therein; and crossbar receiving portion 138, which further includes third aperture 140 for receiving a pin, rivet, or bolt therein (see also FIG. 4B). Second lower leg receptacle 150 includes leg receiving portion 152, which further includes first and second apertures 154 and 156 respectively for receiving rivets or bolts therein; and crossbar receiving portion 158, which further includes third aperture 160 for receiving a pin, rivet, or bolt therein.

Figure 2:
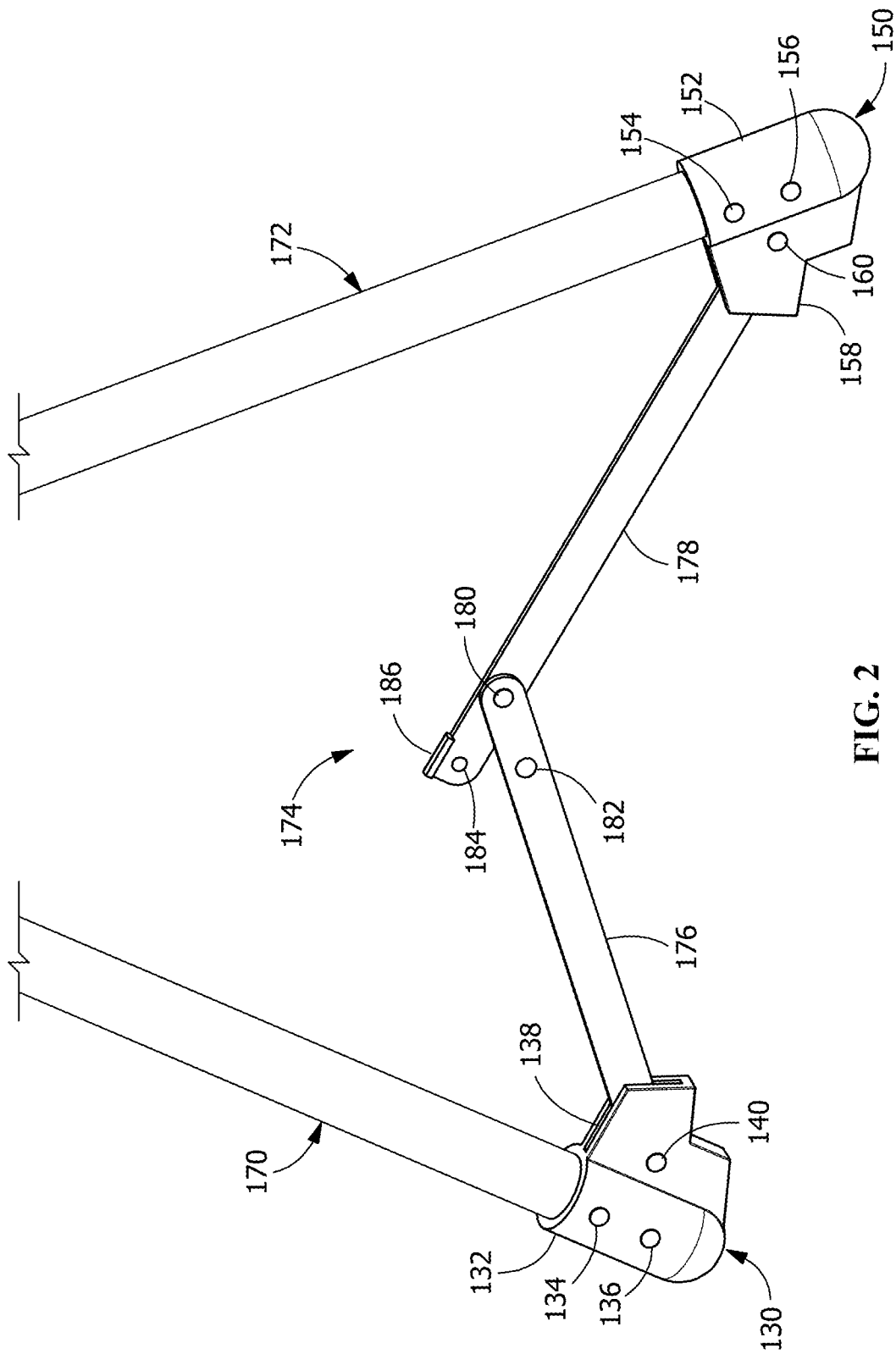
FIG. 2 is a front, perspective view of the lower portion of the collapsible leg assembly of FIG. 1, shown in a partially collapsed position.
Figure 3:
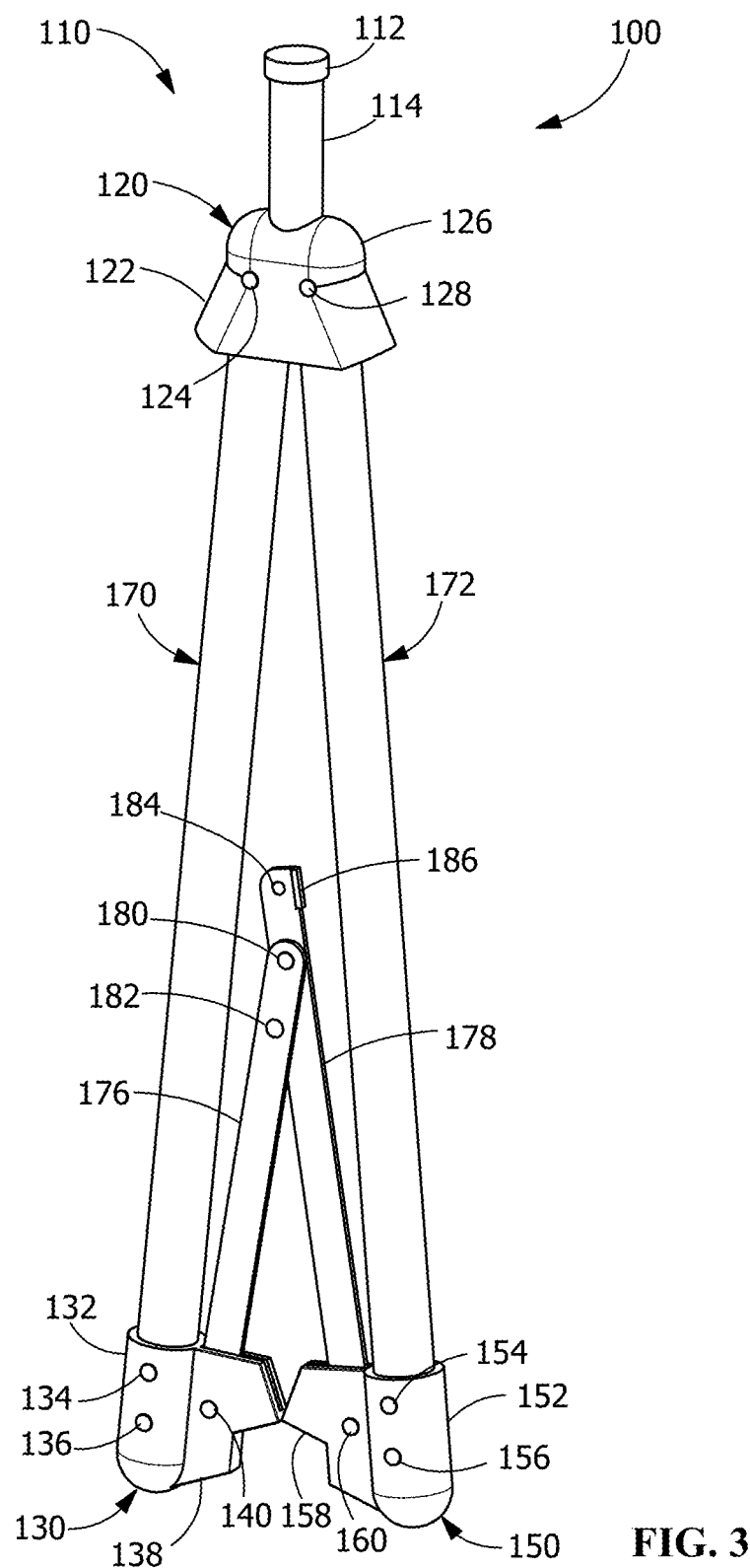
FIG. 3 is a front, perspective view of the collapsible leg assembly of FIG. 1, shown in a fully collapsed position.

With reference to FIGS. 1-3, the upper end of first leg 170 is inserted into first leg receiving portion 122 and secured therein by inserting a pin, rivet, bolt, or the like through first aperture 124 in a manner that permits the upper end of first leg 170 to rotate or pivot within upper leg receptacle 120. Likewise, the upper end of second leg 172 is inserted into second leg receiving portion 126 and secured therein by inserting a pin, rivet, bolt, or the like through second aperture 128 in a manner that permits the upper end of second leg 172 to rotate or pivot within upper leg receptacle 120. The lower end of first leg 170 is inserted into leg receiving portion 132 and secured therein by inserting pins, rivets, or bolts through first and second apertures 134 and 136 in a manner that does not permit rotation of the lower end of first leg 170 within first lower leg receptacle 130. Likewise, the lower end of second leg 172 is inserted into leg receiving portion 152 and secured therein by inserting pins, rivets, or bolts through first and second apertures 154 and 156 in a manner that does not permit rotation of the lower end of second leg 172 within second lower leg receptacle 150. First section 176 of hinged crossbar 174 is inserted into crossbar receiving portion 138 and secured therein by inserting a pin, rivet, bolt or the like through third aperture 140 in a manner that permits rotation of first section 176 within first lower leg receptacle 130. Likewise, second section 178 of hinged crossbar 174 is inserted into crossbar receiving portion 158 and secured therein by inserting a pin, rivet, bolt or the like through third aperture 160 in a manner that permits rotation of second section 178 within second lower leg receptacle 150.

With reference to FIG. 2, hinged crossbar 174 includes first section 176 that is connected to second section 178 by rivet 180 (or similar device) that permits rotational movement between sections 176 and 178. First and second detents 182 and 184 engage one another when hinged crossbar 174 is in a fully open position and operate to properly align first and second sections 176 and 178 with one another and to maintain hinged crossbar 174 in the open position. Stop 186 is formed on the upper surface of second section 178 at one end thereof and operates to prevent hinged crossbar 174 from collapsing in a downward direction when in the fully open position.

Figure 10A:
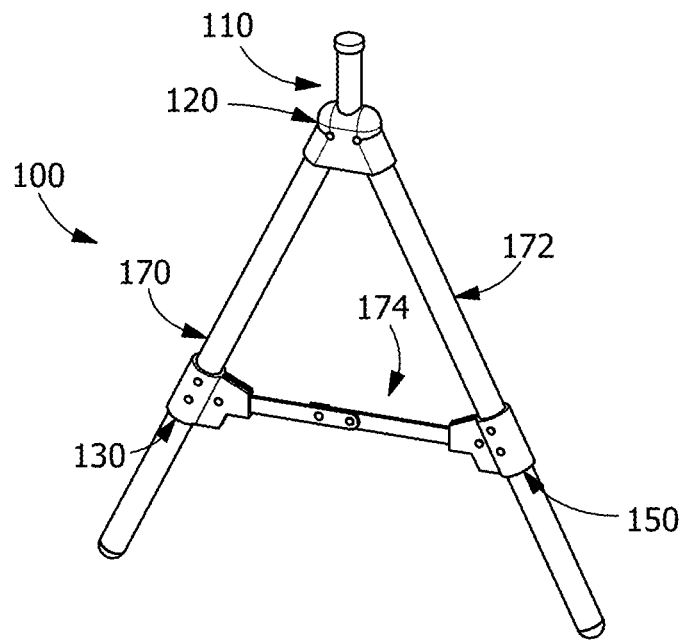
FIG. 10A is a side perspective view of an alternate embodiment of the present invention, wherein the lower portion of the collapsible leg assembly has been moved upward along the length of the legs to provide clearance under the lower portion of the collapsible leg assembly.

FIG. 1 shows collapsible leg assembly 100 in a fully open position; FIG. 2 shows collapsible leg assembly 100 in a partially collapsed position, and FIG. 3 shows collapsible leg assembly 100 in a fully collapsed position. When in the fully open position, a user of collapsible leg assembly 100 simply exerts upward force on hinged crossbar 174 near rivet 180 to disengage detents 182 and 184 from one another. By then exerting force inwardly on first and second legs 170 and 172, hinged crossbar 174 folds further upward and legs 170 and 172 move inward such that the entire assembly collapses into the configuration shown in FIG. 3. FIG. 10A provides an illustration of an alternate embodiment of collapsible leg assembly 100, wherein the entire lower leg receptacle and hinged crossbar assembly has been moved upward along the length of first and second legs 170 and 172 to create clearance under hinged crossbar 174.

Most self-leveling platforms using the present invention will include two or more collapsible leg assemblies 100 attached to the bottom of the platform by a bracket assembly that permits the platform to be leveled on uneven surfaces in the manner described above. An exemplary embodiment of bracket assembly 300 is shown in FIG. 1. In this embodiment, bracket assembly 300 includes first portion 302, which further includes flange and stem receiving portion 304, bolt receiving apertures 306 and 308, and carriage bolt receiving structure 309; and second portion 310, which further includes flange and stem receiving portion 312, bolt receiving apertures 314 and 316, and carriage bolt receiving structure 318. In a manner similar to what is disclosed in U.S. Pat. Nos. 9,140,401 and 9,453,608, first and second portions 302 and 310 cooperate with one another to enclose and house flange 112 and stem 114 in a manner that permits pivot device 110 to freely pivot and rotate within bracket assembly 300. While the embodiment of bracket assembly 300 shown in FIG. 1 is designed to be pivotally mounted on a crossbeam (e.g., a 2×4 piece of lumber), the mechanical relationship between bracket assembly 300 and pivot device 110 is consistent across all current STABLZ® products. Accordingly, the self-leveling feature in each embodiment functions in basically the same or very similar manner.

Figure 5:
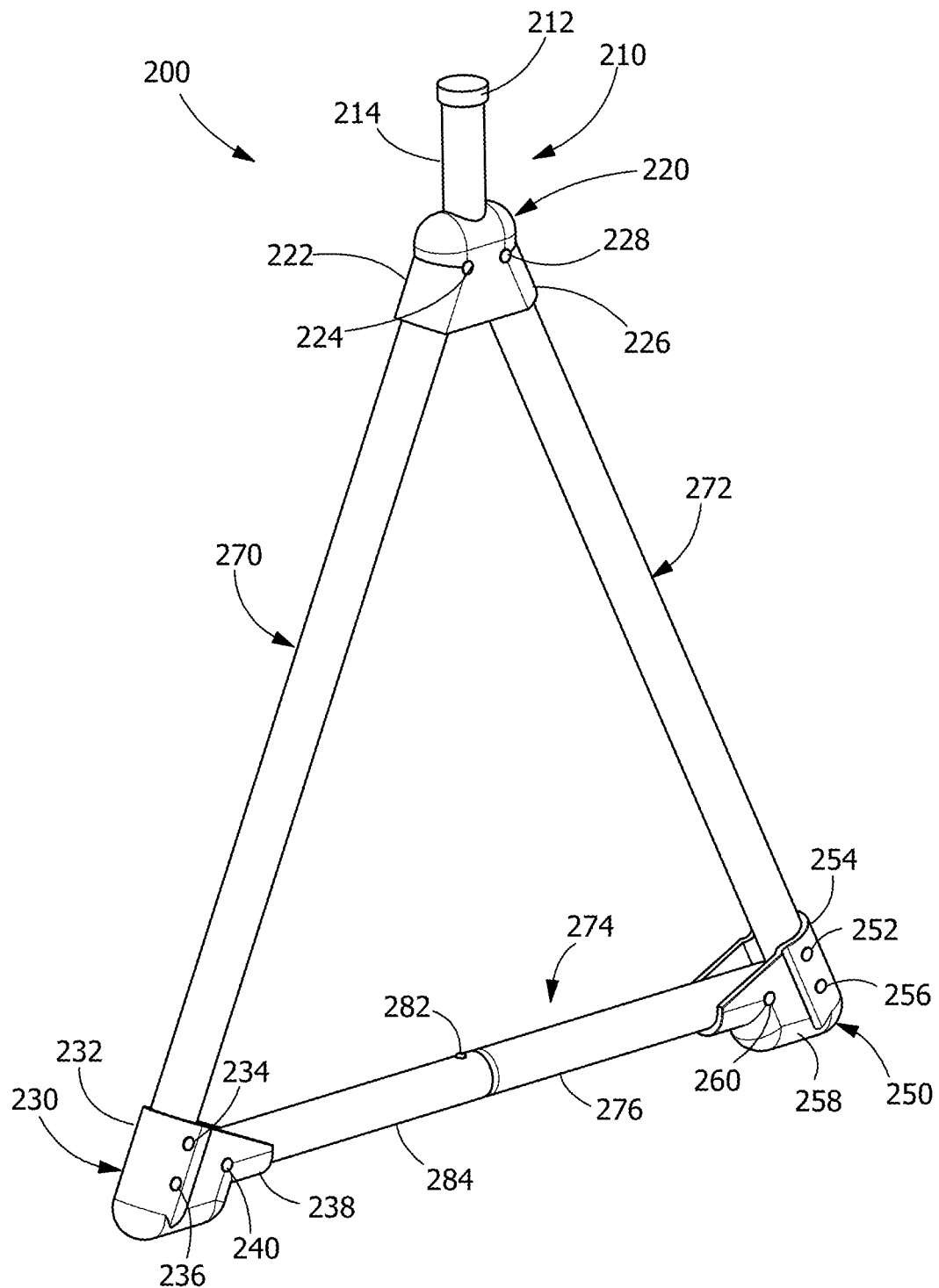
FIG. 5 is a front, perspective view of a collapsible leg assembly in accordance with a second embodiment of the present invention.
Figure 9A:
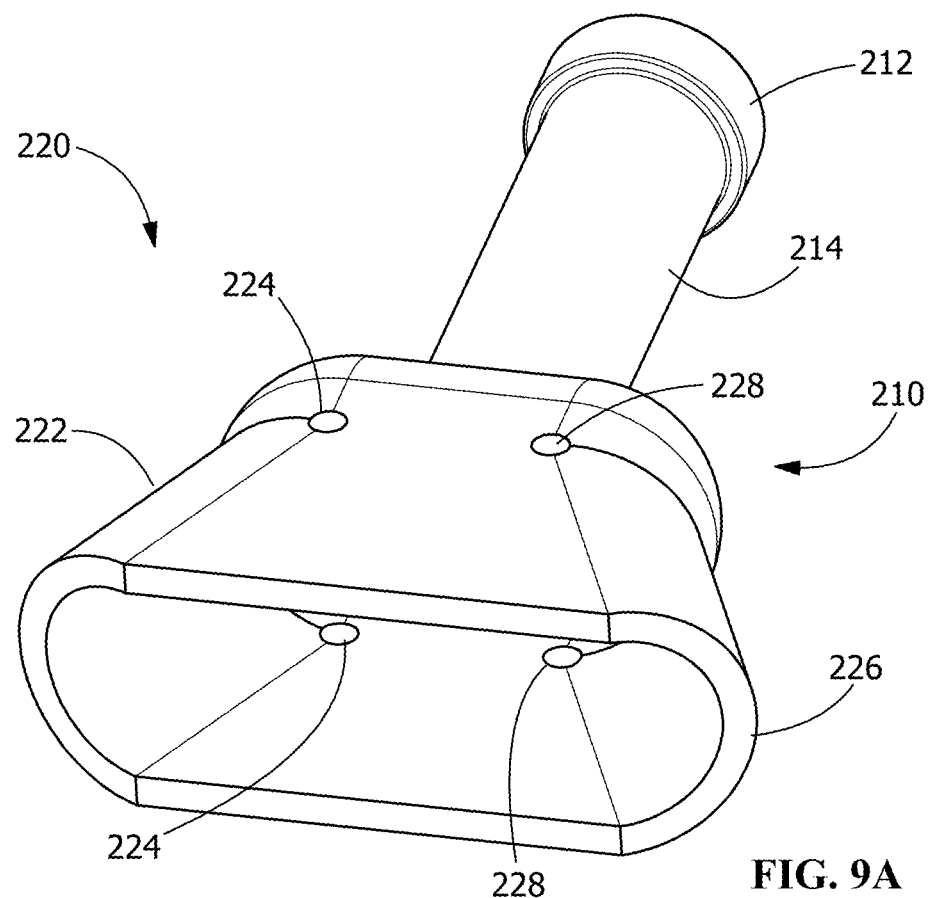
FIG. 9A is a bottom perspective view of an upper leg receptacle component, in accordance with a second exemplary embodiment of the present invention.
Figure 9B:
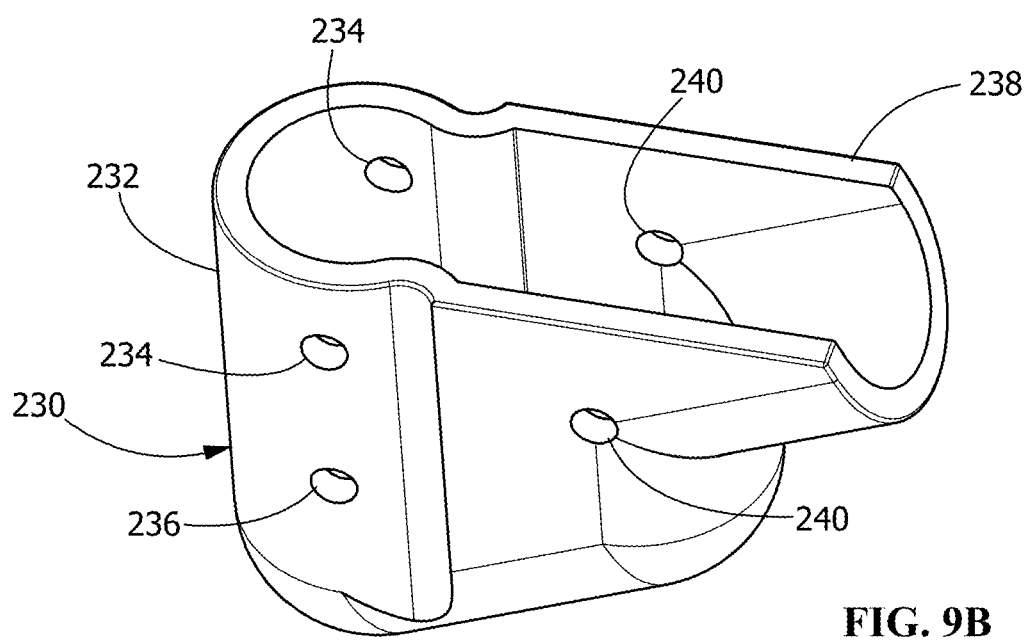
FIG. 9B is a side perspective view of a lower leg receptacle component, in accordance with a second exemplary embodiment of the present invention.

FIG. 5 provides a front, perspective view of a collapsible leg assembly in accordance with a second embodiment of the present invention. As shown in FIG. 5, collapsible leg assembly 200 (the overall geometry of which is typically triangular) includes pivot device 210, upper leg receptacle 220, first lower leg receptacle 230, second lower leg receptacle 250, first leg 270, second leg 272, and tubular crossbar 274. Pivot device 210, which is adapted to pivotally and rotationally engage bracket assembly 300, includes flange 212, which is positioned on top of stem 214. Upper leg receptacle 220 is formed integrally with pivot device 210 and includes first leg receiving portion 222, which further includes first aperture 224 for receiving a pin, rivet, or bolt therein; and second leg receiving portion 226, which further includes second aperture 228, also for receiving a pin, rivet, or bolt therein (see also FIG. 9A). First lower leg receptacle 230 includes leg receiving portion 232, which further includes first and second apertures 234 and 236 respectively for receiving rivets or bolts therein; and crossbar receiving portion 238, which further includes third aperture 240 for receiving a pin, rivet, or bolt therein (see also FIG. 9B). Second lower leg receptacle 250 includes leg receiving portion 252, which further includes first and second apertures 254 and 256 respectively for receiving rivets or bolts therein; and crossbar receiving portion 258, which further includes third aperture 260 for receiving a pin, rivet, or bolt therein.

With reference to FIGS. 5-8, the upper end of first leg 270 is inserted into first leg receiving portion 222 and secured therein by inserting a pin, rivet, bolt, or the like through first aperture 224 in a manner that permits the upper end of first leg 270 to rotate or pivot within upper leg receptacle 220. Likewise, the upper end of second leg 272 is inserted into second leg receiving portion 226 and secured therein by inserting a pin, rivet, bolt, or the like through second aperture 228 in a manner that permits the upper end of second leg 272 to rotate or pivot within upper leg receptacle 220. The lower end of first leg 270 is inserted into leg receiving portion 232 and secured therein by inserting pins, rivets, or bolts through first and second apertures 234 and 236 in a manner that does not permit rotation of the lower end of first leg 270 within first lower leg receptacle 230. Likewise, the lower end of second leg 272 is inserted into leg receiving portion 252 and secured therein by inserting pins, rivets, or bolts through first and second apertures 254 and 256 in a manner that does not permit rotation of the lower end of second leg 272 within second lower leg receptacle 250. Male section 276 of crossbar 274 is inserted into crossbar receiving portion 258 and secured therein by inserting a pin, rivet, bolt or the like through third aperture 260 in a manner that permits rotation of male section 276 within second lower leg receptacle 250. Likewise, female section 284 of crossbar 274 is inserted into crossbar receiving portion 238 and secured therein by inserting a pin, rivet, bolt or the like through third aperture 240 in a manner that permits rotation of female section 284 within first lower leg receptacle 230.

Figure 6:
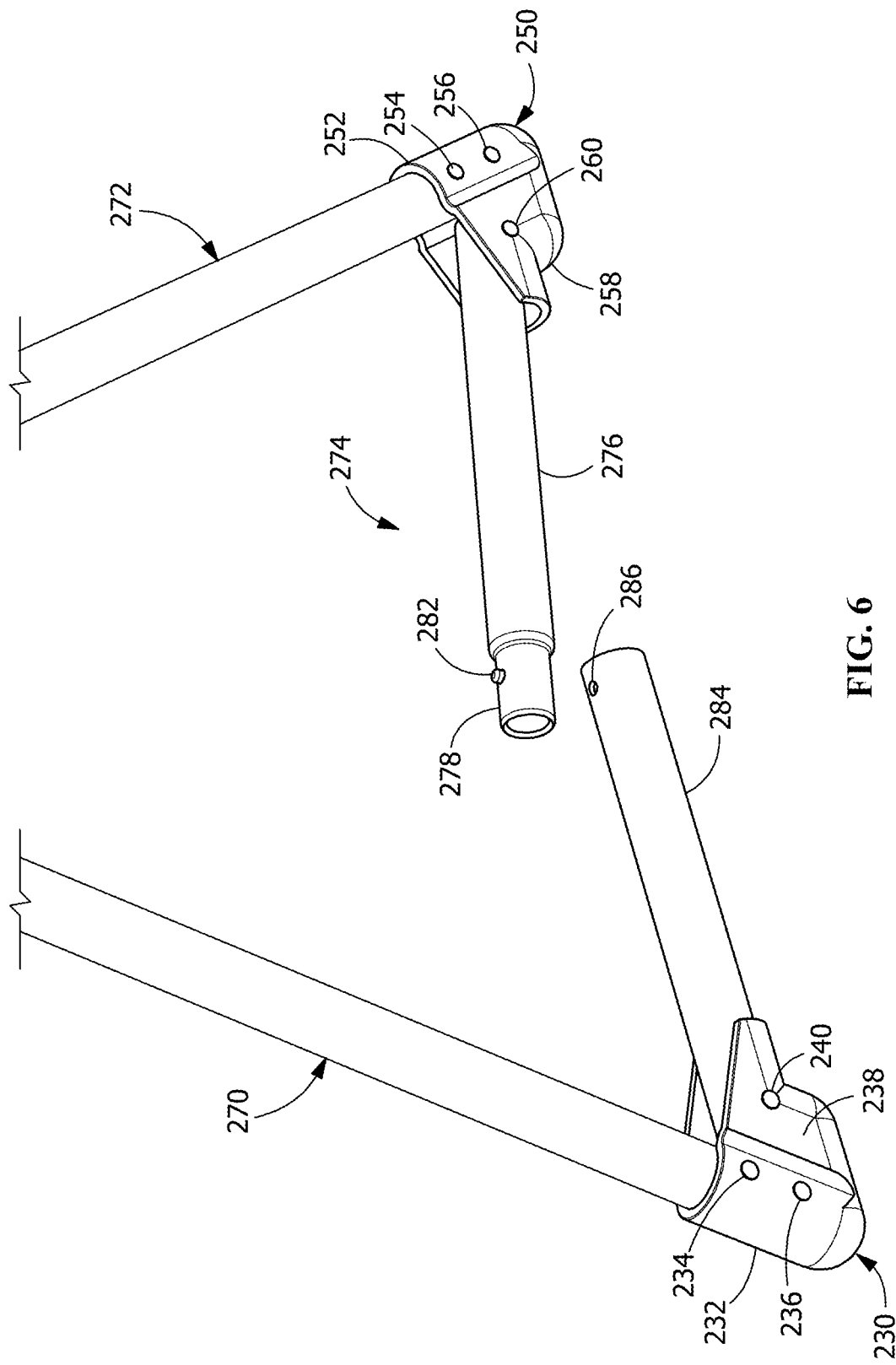
FIG. 6 is a front, perspective view of the lower portion of the collapsible leg assembly of FIG. 5, shown in a partially collapsed position.
Figure 7:
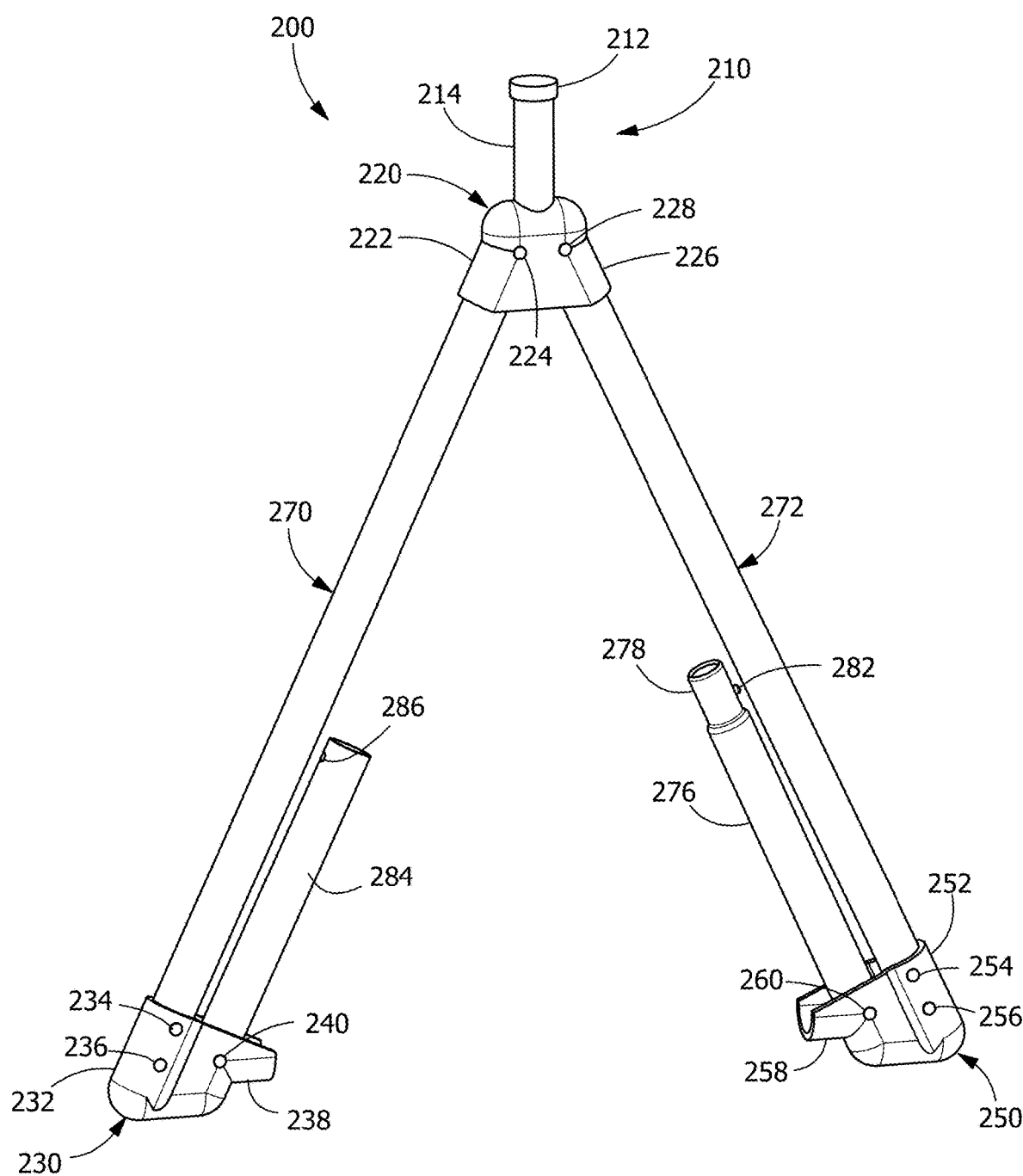
FIG. 7 is a front, perspective view of the collapsible leg assembly of FIG. 5, shown in a partially collapsed position.

With reference to FIG. 6, tubular cross bar 274 includes male section 276, which further includes area of reduced diameter 278 and quick release button 282. Female section 284 is adapted to receive area of reduced diameter 278 and quick release button engages aperture 286 to secure male section 276 to female section 284 when the two sections of crossbar 274 are connected to each other and collapsible leg assembly 200 is in the fully open position shown in FIG. 5. To separate the two sections of tubular crossbar 274 from one another, a user of collapsible leg assembly 200 depresses quick release button 282 and exerts outward force to disengage male section 276 from female section 284 as shown in FIG. 6. Male section 276 and female section 284 are then both folded upward as shown in FIG. 7 and by exerting inward force on first and second legs 270 and 272, the entire assembly collapses into the configuration shown in FIG. 8.

Figure 8:
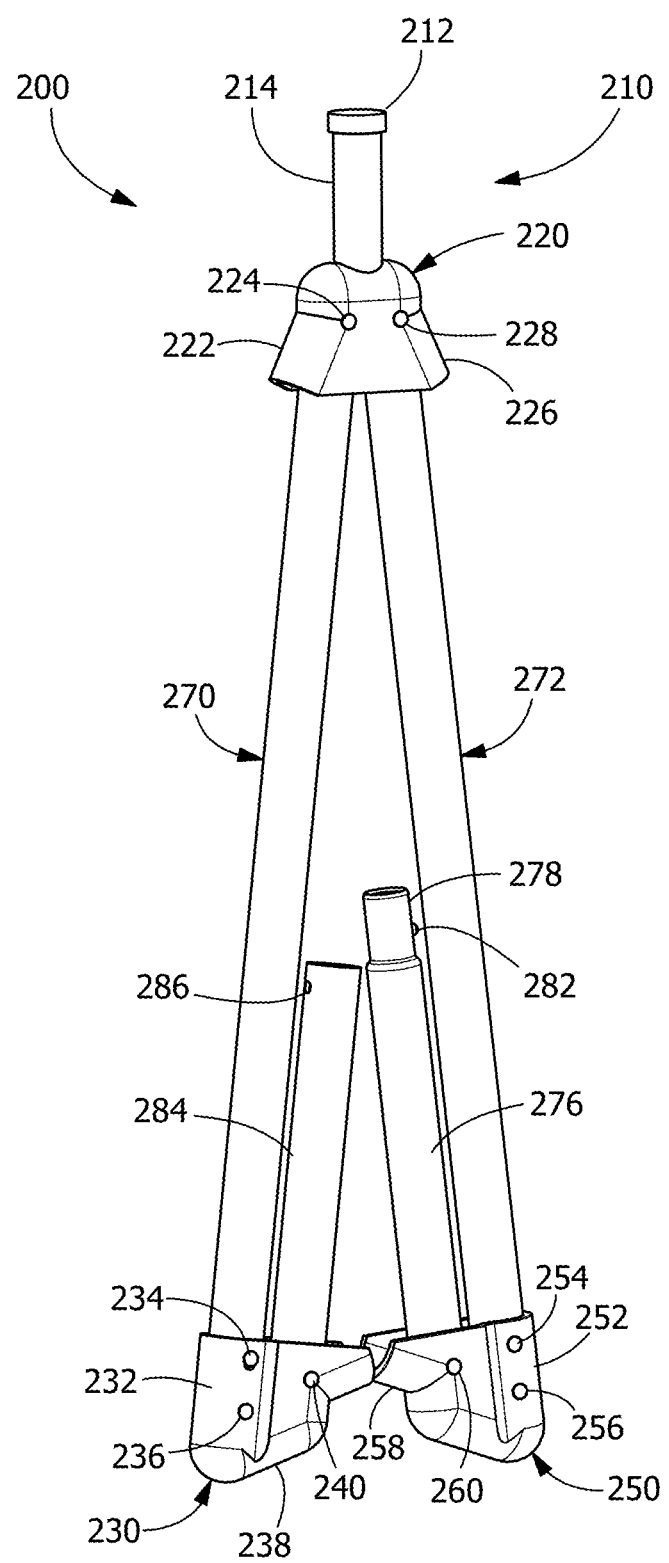
FIG. 8 is a front, perspective view of the collapsible leg assembly of FIG. 5, shown in a fully collapsed position.
Figure 10B:
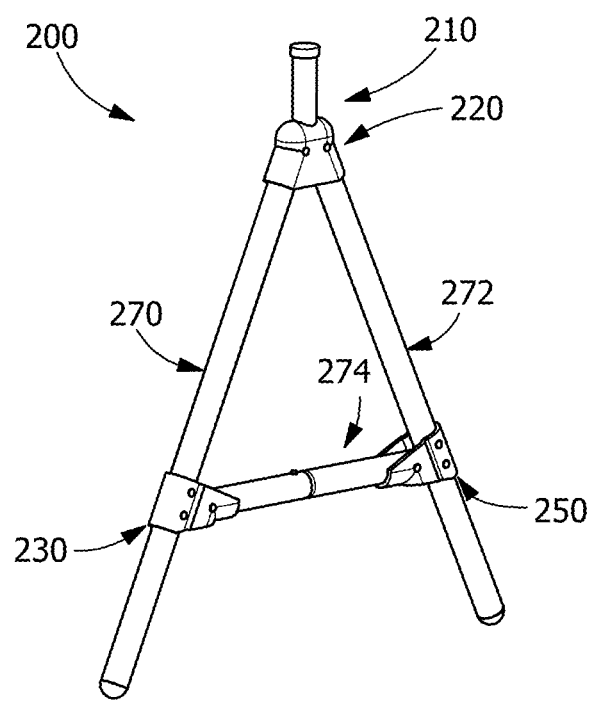
FIG. 10B is a side perspective view of another alternate embodiment of the present invention, wherein the lower portion of the collapsible leg assembly has been moved upward along the length of the legs to provide clearance under the lower portion of the collapsible leg assembly.

FIG. 5 shows collapsible leg assembly 200 in a fully open position; FIGS. 6-7 show collapsible leg assembly 200 in a partially collapsed position, and FIG. 8 shows collapsible leg assembly 200 in a fully collapsed position. FIG. 10B provides an illustration of an alternate embodiment of collapsible leg assembly 200, wherein the entire lower leg receptacle and crossbar assembly has been moved upward along the length of first and second legs 270 and 272 to create clearance under crossbar 274.

Most self-leveling platforms using the present invention will include two or more collapsible leg assemblies 200 attached to the bottom of the platform by a bracket assembly that permits the platform to be leveled on uneven surfaces in the manner described above. An exemplary embodiment of bracket assembly 300, which may be used with both collapsible leg assembly 100 and collapsible leg assembly 200, is shown in FIG. 1. Bracket assembly 300 includes first portion 302, which further includes flange and stem receiving portion 304, bolt receiving apertures 306 and 308, and carriage bolt receiving structure 309; and second portion 310, which further includes flange and stem receiving portion 312, bolt receiving apertures 314 and 316, and carriage bolt receiving structure 318. In a manner similar to what is disclosed in U.S. Pat. Nos. 9,140,401 and 9,453,608, first and second portions 302 and 310 cooperate with one another to enclose and house flange 212 and stem 214 in a manner that permits pivot device 210 to freely pivot and rotate within bracket assembly 300. While the embodiment of bracket assembly 300 shown in FIG. 1 is designed to be pivotally mounted on a crossbeam (e.g., a 2×4 piece of lumber), the mechanical relationship between bracket assembly 300 and pivot device 110 is consistent across all current STABLZ® products. Accordingly, the self-leveling feature in each embodiment functions in basically the same or very similar manner. Upper leg receptacle 120, first lower leg receptacle 130, second lower leg receptacle 150, first leg 170, second leg 172, crossbar 174, and bracket assembly 300 are typically manufactured from any suitable plastic, polymer, metal, or combinations thereof.

While the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed:

1. A collapsible leg assembly, comprising:
   (a) a first leg having an upper portion and a lower portion;
   (b) a second leg having an upper portion and a lower portion;
   (c) a crossbar extending between the lower portions of the first and second legs, wherein the crossbar further includes a first section and a second section, and wherein the first and second sections of the crossbar are detachably connected to one another;
   (d) an upper leg receptacle, wherein the upper leg receptacle is adapted to receive the upper portion of the first leg in a hinged manner and the upper portion of the second leg in a hinged manner;
   (e) a first lower leg receptacle, wherein the first lower leg receptacle is adapted to receive the bottom portion of the first leg in a fixed manner, and wherein the first lower leg receptacle is adapted to receive the first section of the crossbar in hinged manner; and
   (f) a second lower leg receptacle, wherein the second lower leg receptacle is adapted to receive the bottom portion of the second leg in a fixed manner, and wherein the second lower leg receptacle is adapted to receive the second section of the crossbar in hinged manner.

2. The collapsible leg assembly of claim 1, wherein the crossbar is tubular in shape.

3. The collapsible leg assembly of claim 1, wherein the first leg, second leg, and crossbar are configured in the shape of a triangle.

4. A collapsible leg assembly for use with self-leveling platforms or supports, comprising:
(a) a first tubular leg having an upper portion and a lower portion;
(b) a second tubular leg having an upper portion and a lower portion;
(c) a crossbar extending between the first and second legs, wherein the crossbar further includes a first section and a second section, and wherein the first and second sections of the crossbar are detachably connected to one another;
(d) an upper leg receptacle, wherein the upper leg receptacle is adapted to receive the upper portion of the first leg in a hinged manner and the upper portion of the second leg in a hinged manner, and wherein the upper leg receptacle further includes a stem and a flange positioned on top of the stem;
(e) a first lower leg receptacle, wherein the first lower leg receptacle is adapted to receive the first leg in a fixed manner, and wherein the first lower leg receptacle is adapted to receive the first section of the crossbar in hinged manner; and
(f) a second lower leg receptacle, wherein the second lower leg receptacle is adapted to receive the second lower leg in a fixed manner, and wherein the second lower leg receptacle is adapted to receive the second section of the crossbar in hinged manner.

5. The collapsible leg assembly of claim 4, wherein the crossbar is tubular in shape.

6. The collapsible leg assembly of claim 4, wherein the first leg, second leg, and crossbar are configured in the shape of a triangle.

* * * * *